(12) United States Patent
Yu

(10) Patent No.: US 9,845,049 B2
(45) Date of Patent: Dec. 19, 2017

(54) ELONGATED WARNING LAMP

(71) Applicant: NINGBO YINZHOU SELF PHOTOELECTRON TECHNOLOGY CO., LTD., Ningbo (CN)

(72) Inventor: Feng Yu, Ningbo (CN)

(73) Assignee: NINGOBO YINZHOU SELF PHOTOELECTRON TECHNOLOGY CO., LTD. (CN)

( * ) Notice: Subject to any disclaimer, the term of this patent is extended or adjusted under 35 U.S.C. 154(b) by 111 days.

(21) Appl. No.: 15/142,294

(22) Filed: Apr. 29, 2016

(65) Prior Publication Data

US 2017/0074493 A1   Mar. 16, 2017

(30) Foreign Application Priority Data

Sep. 10, 2015  (CN) .......................... 2015 1 0574340
Sep. 10, 2015  (CN) ..................... 2015 2 0699668 U

(51) Int. Cl.
*F21V 29/00* (2015.01)
*B60Q 1/52* (2006.01)
*B60Q 1/26* (2006.01)
*F21S 8/10* (2006.01)

(52) U.S. Cl.
CPC .............. *B60Q 1/52* (2013.01); *B60Q 1/2611* (2013.01); *F21S 48/2206* (2013.01)

(58) Field of Classification Search
CPC . F21V 12/16; F21V 7/09; F21V 7/101; F21V 29/70; F21V 31/005; B60Q 1/52; B60Q 1/2011; B60Q 1/26
See application file for complete search history.

(56) References Cited

U.S. PATENT DOCUMENTS

2005/0265019 A1* 12/2005 Sommers ................ A47F 3/001
                                                                          362/217.16
2008/0037239 A1*  2/2008 Thomas ................ F21V 15/013
                                                                          362/92

* cited by examiner

*Primary Examiner* — Ali Alavi
(74) *Attorney, Agent, or Firm* — Foley & Lardner LLP

(57) ABSTRACT

The present patent application discloses an elongated warning lamp. The elongated warning lamp includes a body, two main light modules and a number of side lights modules; By the match of the upper position cavity and the upper position block and the match of the lower position cavity and the lower position block, in conjunction with the guide position of the guide block and the guide groove, the two main light modules can be quickly assembled into the two sides of the body.

20 Claims, 5 Drawing Sheets

ELONGATED WARNING LAMP

CROSS-REFERENCE TO RELATED PATENT APPLICATIONS

The present application claims priority to and the benefit of both Chinese Patent Application No. 201510574340.X, filed Sep. 10, 2015, and Chinese Patent Application No. 201520699668.X, filed Sep. 10, 2015, both of which are incorporated by reference herein in their entirety.

TECHNICAL FIELD

The present patent application relates to warning lamps, and more particularly, to an elongated warning lamp.

BACKGROUND

An elongated warning lamp is commonly used in police cars, ambulances and law enforcement vehicles of road administration, which mainly can be taken as a warning. Currently, the elongated warning lamp used in vehicles is generally mounted on the outside of the roof of vehicles, comprising an upper and a lower aluminum cover, light shades, lights, a control circuit board and so on. The elongated warning lamp is equipped with switches externally, which can be connected to the power of the cigar lighter in the vehicle with the switch power cord so as to enable lights to work to emit light, which can play a warning.

Affected by structures of its components, it is very inconvenient in assembling and installing the existing elongated warning lamp, while wasting a lot of manpower. Furthermore, it has a low reliability of assembly. And there are some security risks, which are not good for traffic safety.

SUMMARY

Directed to the above-mentioned problems that exists in the prior art, the present patent application provides an elongated warning lamp, which is very convenient to assemble and has a better reliability for assemble so that it can overcome defects including inconvenience in assembling and installing, and a poor reliability in assembling.

In order to solve the above-mentioned technical problems, the present patent application provides an elongated warning lamp. The elongated warning lamp includes: a body, two main light modules connected to the two ends of the body and a number of side light modules connected to the two sides of the body.

The two ends of the body are provided with an upper position cavity and a lower position cavity which plays a reinforcement role; Each connecting end of the main light modules is provided with an upper position block and a lower position block; The upper position block and the upper position cavity match and connect with each other. The upper position block is formed as a flat plate, of which the upper surface and the lower surface are provided with connection projections for enhancing connection uniformity; The lower position block and the lower position cavity match and connect with each other, the lower block is formed as an isosceles trapezium. The two inclined side surfaces thereof are provided connection projections for enhancing connection uniformity; Two guide blocks are also provided between the upper position block and the lower position block, each guide block matches the guide groove which is formed between the upper position cavity and the lower position cavity.

The two sides of the body are provided with slots. The connecting end of the side light module is provided with at least one snap. The snap matches and connects with the slot, and is enable to slide along the slot. The two sides of the body and the connecting ends of the side light module are formed as ramps. When the snap clamps into the slot, the two ramps bond with each other.

In the elongated warning lamp, the upper position cavity includes a first position cavity, a second position cavity located on the two sides of the ends of the body and a third position cavity located between the first upper position cavity and the second upper position cavity; The upper position block includes a first upper position block, a second upper position block located the two sides of the connecting ends of the main light module and a third upper position block located between the upper position block and the second upper position block. The first upper position block, the second upper position block and the third position block match and connect with the first upper position cavity, the second upper position cavity and the third upper position cavity respectively In the elongated warning lamp, the upper surface and the lower surface of the first upper position block, the second upper position block and the third upper position block are provided with the connection projections.

In the elongated warning lamp, the connection projections located on the lower surface are alternately arranged with the connection projections located on the upper surface.

In the elongated warning lamp, the body includes an upper body and a lower body, the lower part of the upper body is provided with a trapezoidal groove. The upper part of the lower body is provided with a trapezoidal projection which matches the trapezoidal groove. The upper position cavity and the lower position cavity are located on the upper body and the lower body respectively.

In the elongated warning lamp, the main light module includes a connecting holder, a main light set and two side light sets. One end of the connecting holder is opened with a connecting ring groove which is connected to the main light set and the two side light sets. The two side light sets plug into the two side of the main light sets with the socket pin thereon; the other end of the connecting holder is provided with the upper position block and the lower position block.

In the elongated warning lamp, the main light module further includes a mask. The mask covers the main light set and the two side light sets, then plugs into the connecting ring groove.

In the elongated warning lamp, the connecting ring groove is provided with an annular sealed ring.

In the elongated warning lamp, the main light set includes a main light holder, a main light cover, and a main light plate located in the main light holder. The two sides of the main light holder are provided with a connecting buckle. The two sides of the main light cover are provided with connecting buckle groove. The connecting buckle fastens the connecting buckle groove. The socket pin plugs into the connection buckle groove so as to plug the two side light sets into the two sides of the main light set.

In the elongated warning lamp, the end of the main light holder toward the connecting holder is provided with a outgoing coil for fixing the power cord. The outgoing coil is provided with a number of outlet holes. The outlet holes are formed as a shape being big at both ends and small in the middle.

In the elongated warning lamp, the two ends of the outlet holes are extended outward to be formed as a taper.

In the elongated warning lamp, the side light sets are provided with a light guide strip.

In the elongated warning lamp, the side light modules include a light cover with opening, a reflective cup and a light plate provided in the light cover. The two ends of the side part of the light cover are provided with the snap. The opening is provided with a heat-dissipating plate.

In the elongated warning lamp, the opening is provided with a plurality of bumps, the heat-dissipating plate contacts with a plurality of bumps and pastes into the opening with glue.

In the elongated warning lamp, the reflective cup is provided with a first reflective layer and a second reflective layer for transition connection. The first reflective layer and the second reflective layer are formed as an arc.

Compared with the prior art, the elongated warning lamp of the present patent application includes a body which assembles two main light modules and a plurality of side light modules into a warning lamp. And by the match of the upper position cavity and the upper position block and the match of the lower position cavity and the lower position block, in conjunction with the guide position of the guide block and the guide groove, the two main light modules can be quickly assembled into the two ends of the body. Furthermore by the match of the slot and the snap, in conjunction with the guide position of the two ramps, a plurality of side light modules can be quickly assembled into the two sides of the body so that it is very convenient to assemble the elongated warning lamp. Furthermore, the surfaces of the upper position block and lower position block are provided with connection projections so that surface contact can be turned into point contact, reducing contact gap while increasing connection uniformity, and then improving the reliability of the assembly.

The elongated warning lamp of the present patent application has the advantages of convenient assembly, a good reliability of the assembly and so on.

Figure 1:
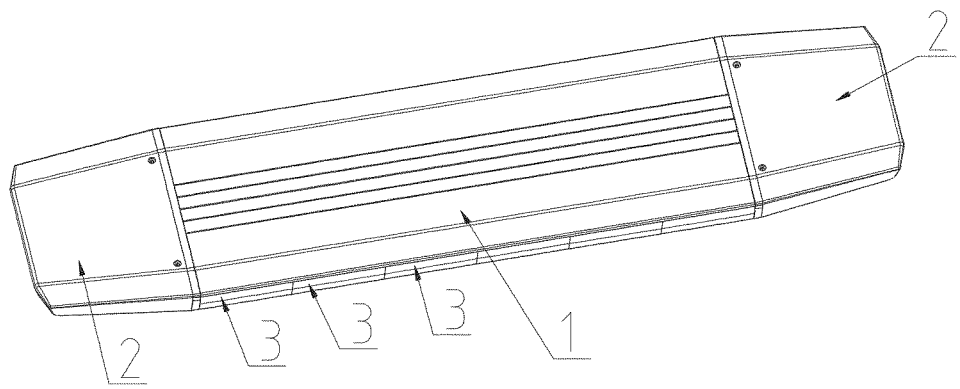
FIG. 1 is a structure schematic diagram of the elongated warning lamp of the embodiment of the invention.

Reference numerals in the accompanying drawing figures include the following: 1: body; 2: main light module; 3: side light module; 4: upper position cavity; 5: lower position cavity; 6: upper position block; 7: lower position block; 8: connection projection; 9: guide block; 10: guide groove; 11: slot; 12: snap; 13: ramp; 14: first upper position cavity; 15: second upper position cavity; 16: third upper position cavity; 17: first upper position block; 18: second upper position block; 19: third upper position block; 20: upper body; 21: lower body; 22: trapezoidal groove; 23: trapezoidal projection; 24: connecting holder; 25: main light set; 26: side light set; 27: connecting ring groove; 28: socket pin; 29: mask; 30: annular sealed ring; 31: main light holder; 32: main light cover; 33: main light plate; 34: connecting buckle; 35: connecting buckle groove; 36: outgoing coil; 37: outlet hole; 38: light guide strip; 39: opening; 40: light shade; 41: reflective cup; 42: light plate; 43: heat-radiating plate; 44: bump; 45: first reflective layer 45; 46: second reflective layer.

DETAILED DESCRIPTION

Below with reference to the accompanying drawing and embodiments, specific embodiments of the present patent application will be described in further detail. The following embodiments illustrate the patent application but not to limit the scope of the present patent application.

Figure 2:
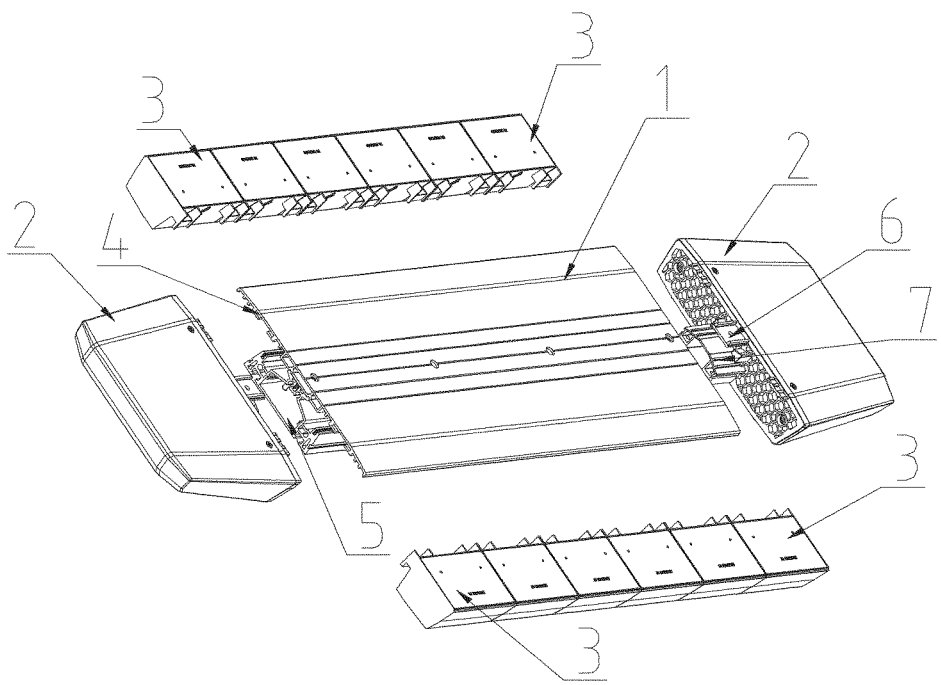
FIG. 2 is an exploded structure schematic diagram of FIG. 1.

The structure of the elongated warning lamp of the present embodiment as shown in FIGS. 1 and 2 includes: a body 1, two main light modules 2 and a plurality of side lights modules 3.

The two main light modules 2 are connected to the two ends of the body 1. The two ends of the body 1 are provided with an upper position cavity 4 and a lower position cavity 5 which plays a reinforcement role. Each connecting end of the main light module 2 is provided with the upper position block 6 and the lower position block 7. The upper position block 6 matches and connects with the upper position cavity 4. The lower position block 7 matches and connects with the lower position cavity 5. By the match of the upper position cavity 4 and the upper position block 6 and the match of the lower position cavity 5 and the lower position cavity 5, the two main light modules 2 can be quickly assembled into the two ends of the body 1.

Figure 3:
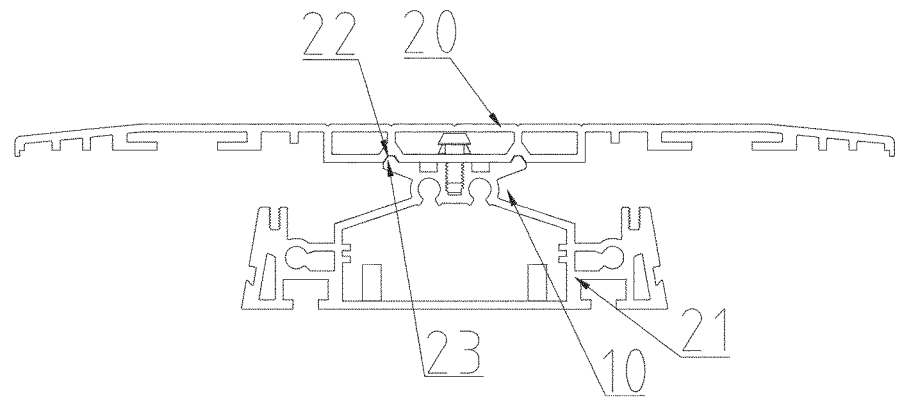
FIG. 3 is a structure schematic diagram of the body in FIG. 2.
Figure 4:
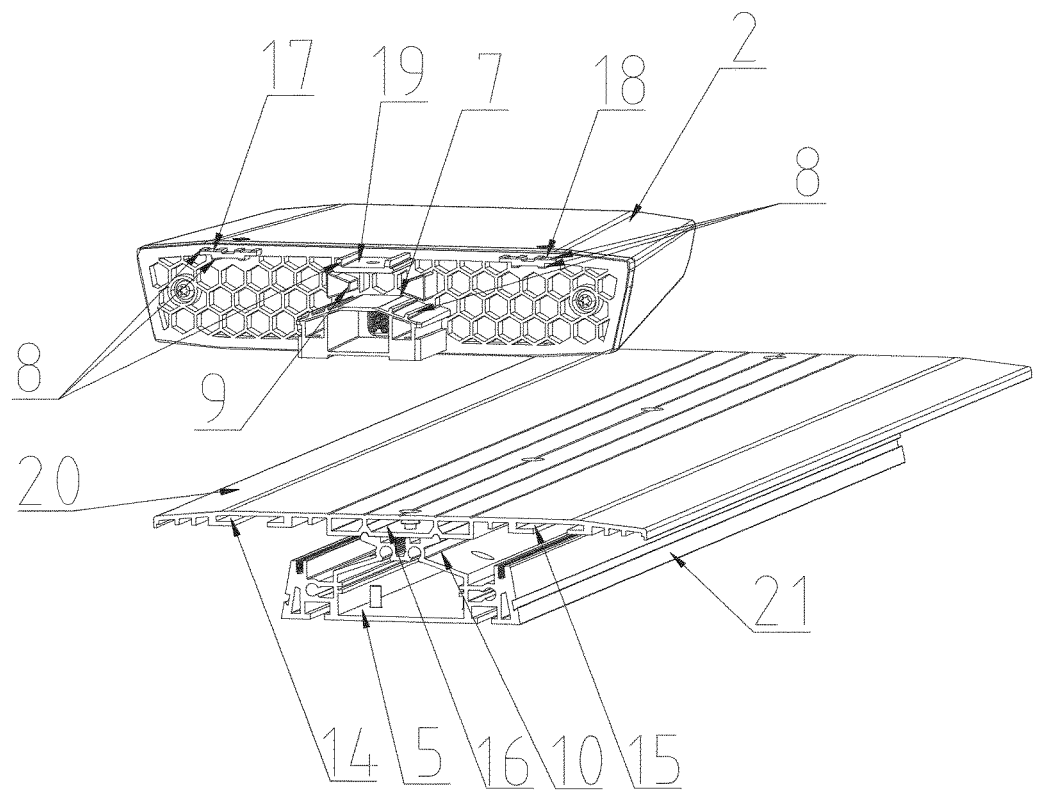
FIG. 4 is an exploded structure schematic diagram of the main light module and the body in FIG. 2.
Figure 5:
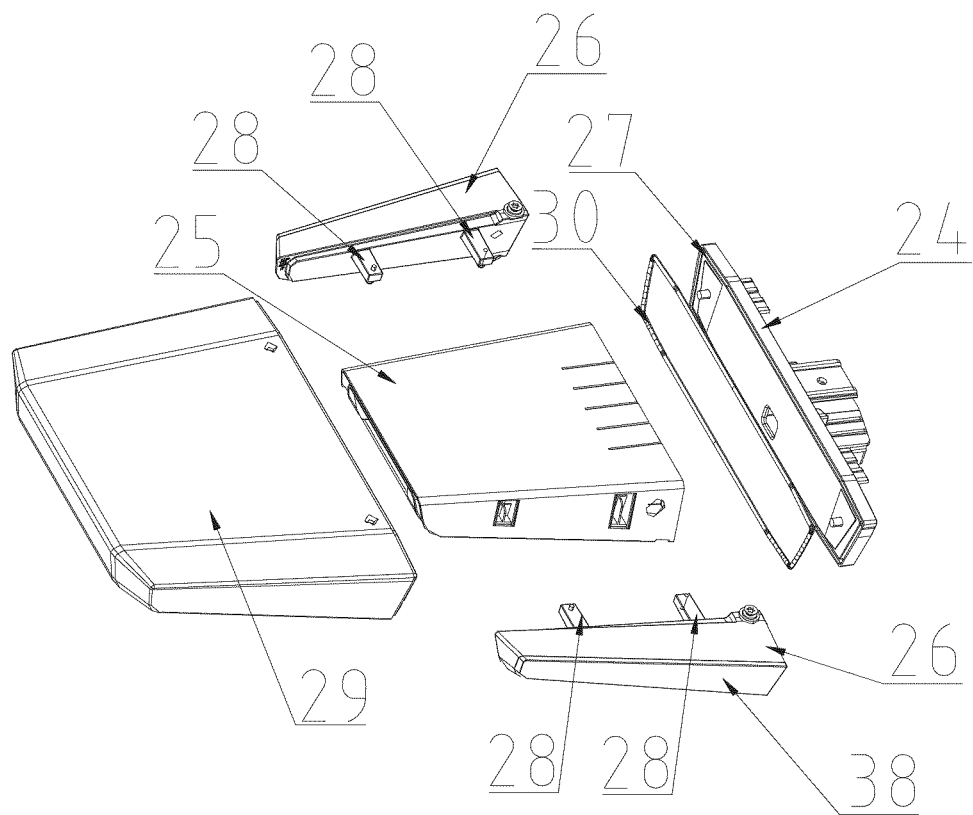
FIG. 5 is a structure schematic diagram of the main light module in FIG. 4.
Figure 6:
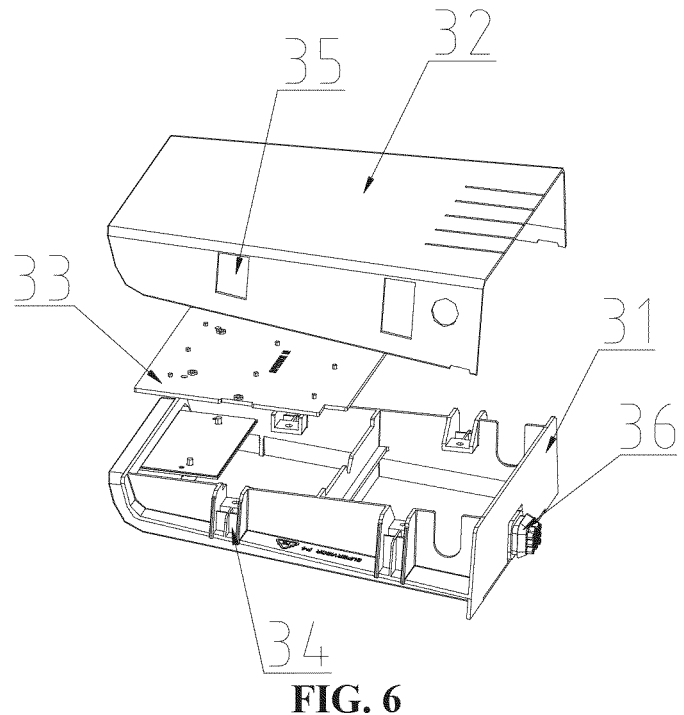
FIG. 6 is a structure schematic diagram of the main light set in FIG. 5.
Figure 7:
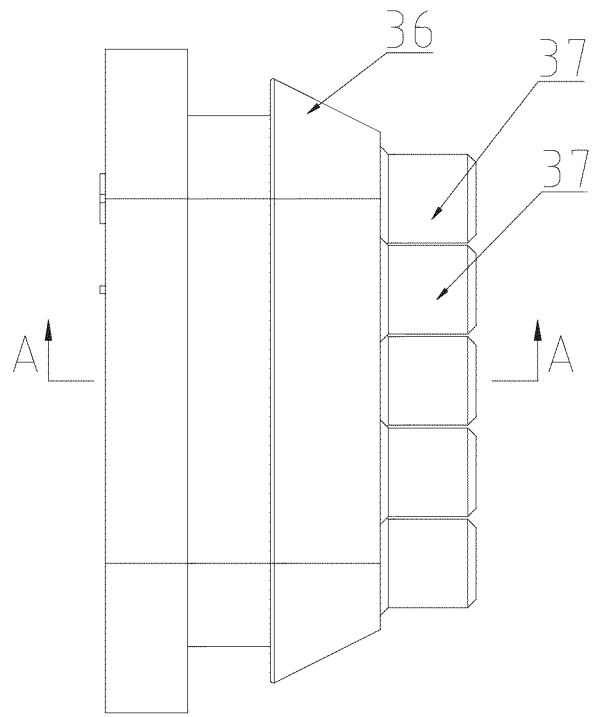
FIG. 7 is a structure schematic diagram of the outgoing coil in FIG. 6.
Figure 8:
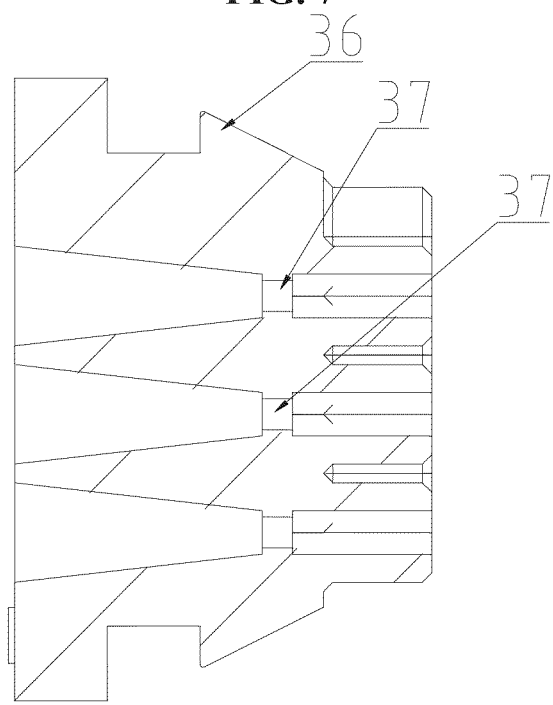
FIG. 8 is an A-A sectional view of FIG. 7.

In particular, referring to FIG. 2 to FIG. 4, the body 1 includes an upper body 20 and a lower body 21 as shown. The lower part of the upper body 20 is provided with a trapezoidal groove 22. The upper part of the lower body is provided with a trapezoidal projection 23 which matches the trapezoidal groove 22. By the match of the trapezoidal groove 22 and the trapezoidal projection 23, the upper body 20 and the lower body 21 can be connected into the body 1. The upper position cavity 4 and the lower position cavity 5 are located on the upper body 20 and the lower body respectively. The upper position cavity 4 includes a first upper position cavity 14 and a second position cavity 15 located on the body 1 (i.e. the upper body 20), and a third upper position cavity 16 located between the first upper position cavity 14 and the second upper position cavity 15. Correspondingly, the upper position block 6 includes a first upper position block 17 and a second upper position block 18 located at the two sides of the connecting ends of the main light module 2, and a third upper position block located between the first upper position block 17 and the second upper position block 19. The first upper position block 17, the second upper position block 18 and the third upper position block 19 match and connect with the first upper position cavity 14, the second upper position cavity 15 and the third upper position cavity 16 respectively. Furthermore, two guide blocks 9 are provided between the upper position cavity 6 and the lower position block 7. The two guide blocks 9 match the two guide grooves formed between the upper position cavity 4 and the lower position cavity 5. Thus, by the match of the upper position cavity 4 and the upper position block 6 and the match of the lower position cavity 5 and the lower position block 6, in conjunction with the guide position of the guide block 9 and the guide groove 10, the two main light modules can be quickly assembled into the two ends of the body.

In order to improve the reliability of connecting the two main light modules 2 and the body 1, the upper position block 6 is provided as a flat plate, of which the upper surface and lower surface are provided with connection projections 8 for enhancing connecting uniformity. That is, the upper surfaces and the lower surfaces of the first upper position block 17, the second upper position block 18 and the third upper position block 19 are all provided with connection projections 8. At the same time, the lower position block 7 is provided as an isosceles trapezoidal shape, and is provided with connection projections 8 on the two inclined side surfaces to enhancing connecting uniformity. The connection projections 8 can change surface contact to point contact, reducing contact gap, increasing connection uniformity, thus improving the reliability of the assembly. Alternatively, the connection projections 8 located on the lower surface can be alternately arranged with the connection projections 8 located on the upper surface to improve connection uniformity further.

The structure of the main light module 2 in the present embodiment as shown in FIGS. 5 to 8, includes a connecting holder 24, a main light set 25, two side light sets 26 and a mask 29. One end of the connecting holder 24 is opened with a connecting ring groove 27 which connects with the main light set 25 and the two side light sets 26. Each side light set 26 plugs into each side of the main light set 25 with the socket pin 28 thereon respectively. The other end of the connecting holder 24 is provided with the upper position block 6 and the lower position block 7. The mask 29 covers the main light set 25 and the two side light sets 26 and then plugs into the connecting ring groove 27. The connecting ring groove 27 is provided with an annular sealed ring for preventing water from entering the main light module 2.

Figure 9:
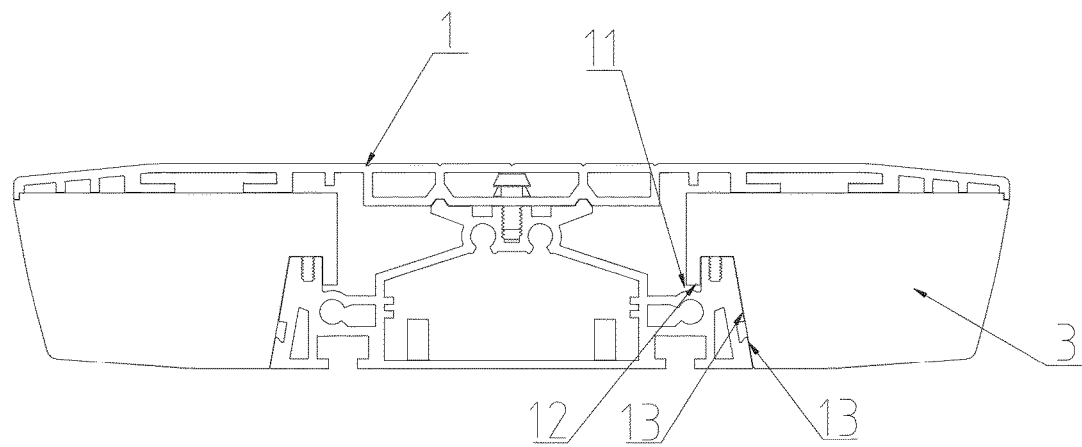
FIG. 9 is a structure schematic diagram of the side light module and the body in FIG. 2.
Figure 10:
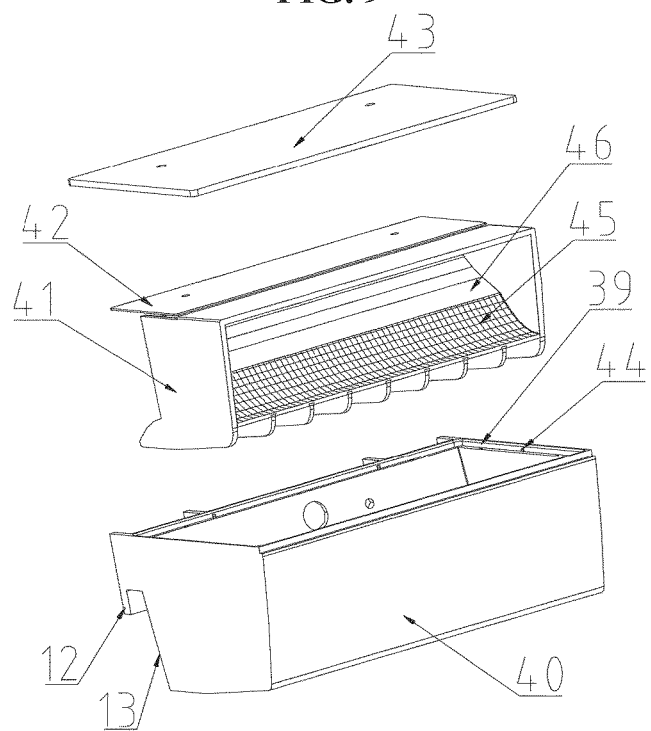
FIG. 10 is a structure schematic diagram of the side light module in FIG. 9.

The main light set 25 includes a main light holder 31, a main light cover 32 and a main light plate located in the main light holder 31. The side light sets 26 are provided with light guide strips 28 in order to improve the safety performance of vehicles. Specifically, the two sides of the main light holder 31 are provided with a connecting buckle. The two sides of the main light cover 32 are provided with a connecting buckle groove. The connecting buckle 34 fastens the connecting buckle groove 35 so that the main light cover 32 can be connect to the main light holder 31. When the socket pin 28 plugs into the connecting buckle groove 35, each side light set 26 can be plugged into each side of the main light set 25 respectively. Therefore it is very convenient to assemble. The end of the main light holder 31 toward the connecting holder 24 is provided with a outgoing coil 36 for fixing the power cord 36. The outgoing coil 36 is provided with a plurality of outlet holes 37. The outlet holes are formed as a shape being big at both ends and small in the middle. Each end of the outlet holes 37 in the present embodiment is extended outward to form a taper. This setting mechanism makes installation convenient, saving effort and waterproof Further, referring to FIG. 2, FIG. 9 and FIG. 10, a plurality of the side light modules are connected to the two sides of the body 1 as shown. In particular, the two sides of the body 1 are provided with a slot 11. The connecting end of the side light module is provided with at least one snap 12. The snap 12 matches and connects with the slot 11. The snap 12 can slide along the slot 11. The two sides of the body 1 and the connecting end of the side light modules 3 are formed as ramps 13. When the snap 12 plugs into the slot 11, the two ramps 13 bond to each other. Thus, by the match of the slot 11 and the snap 12, in conjunction with the guide position of the two ramps 13, you can quickly assemble a plurality of side light modules 3 into the two sides of the body 1 so that it is very convenient to assemble the side light modules and has a good reliability of assemble.

The side light module 3 of the present embodiment includes a light shade 40 with an opening 39, a reflective cup 41 and a light plate 42 provided in the light shade 40. The two ends of the side part of the light shade 40 are provided with the snap 12 respectively. The opening 39 is provided with a heat-radiating plate 43. In particular, the opening 39 is provided with a plurality of bumps 44. The heat-radiating plate 43 contacts with a plurality of bumps 44 and pastes into the opening 39 with glue. A plurality of bumps 44 make the four contact surfaces evenly spaced and uniformly gummed, and then make the connecting fixity consistent. The reflective cup 41 is provided with a first reflective layer 45 and a second reflective layer 46 for transition connection. The first reflection layer 45 and the second reflective layer 46 are arc shape for double reflection to facilitate utilizing limited light source.

As described above, in the elongated warning lamp of the present patent application, the body assembles the two main light modules and a plurality of side light modules into a warning lamp. by the match of the upper position cavity and the upper position block and the match of the lower position cavity and the lower position block, in conjunction with the guide position of the guide block and the guide groove, the two main light modules can be quickly assemble to the two ends of the body. By the match of the slot and the snap, in conjunction with the guide position of the two slaps, a plurality of side light modules can be quickly assembled into both sides of the body. Therefore, it is very convenient to assemble the elongated warning lamp. In addition, both the surface of the upper position block and the surface of the lower position block are provided with connection projections so that surface contact can be turned into point contact, reducing contact gap, increasing connection uniformity, thus improving the reliability of the assembly.

The elongated warning lamp of the present patent application has advantages of convenient assemble, a good reliability of assemble and so on.

These are only a preferred embodiment of the present patent application, it should be noted that those of ordinary skill in the art, on the premise of without departing from the principles of the present patent application, can also make a number of improvements and modifications, these modifications and variations should be regarded as the scope of the present patent application.

What is claimed is:

1. An elongated warning lamp, wherein the elongated warning lamp comprising:
    a body,
    two main light modules connected to two sides of the body,
    and a plurality of side light modules connected to the two sides of the body;
    wherein the two ends of the body are provided with an upper position cavity and a lower position cavity which play a reinforcement role, each connecting end of the main light modules is provided with an upper position block and a lower position block; the upper position block matches and connects with the upper position cavity; the upper position block is formed in a flat shape, both upper surface and lower surface of the upper position block are provided with connection projections for enhancing connecting uniformity; the lower position block matches and connects with the lower position cavity; the lower position block is formed in an isosceles trapezoid shape, two inclined side surfaces of the lower position block are provided with the connection projections for enhancing connecting uniformity; two guide block are provided between the upper position block and the lower position block; the two guide block match two guide grooves formed between the upper position cavity and the lower position cavity;

wherein two sides of the body are provided with a slot, a connecting end of the side light module is provided with at least one snap, the snap matches and connects with the slot, and can slide along the slot; two sides of the body and connecting ends of the side light module are formed as ramps, the two ramps bond with each other, when the snap plugs into the slot;

wherein the upper position cavity comprises a first upper position cavity, a second upper position cavity located on the two sides of end parts of the body and a third upper position cavity located between the first upper position cavity and the second upper position cavity; the upper position block comprises a first upper position block, a second upper position block located two sides of connecting ends of the main light modules and a third upper position block located between the first upper position block and the second upper position block, the first upper position block, the second upper position block and the third upper position block match and connect with the first upper position cavity, the second upper position cavity and the third upper position cavity respectively;

wherein both upper surface and lower surface of the first upper position block, the second upper position block and the third upper position block are provided with the connection projections; and wherein the connection projections located on lower surfaces and the connection projections located on the upper surfaces staggered with each other.

2. The elongated warning lamp according to claim 1, wherein the body comprises an upper body and a lower body, lower part of the upper body is provided with a trapezoidal groove, upper part of the lower body is provided with a trapezoidal projection which matches the trapezoidal groove; the upper position cavity and the lower position cavity is located on the upper body and the lower body respectively.

3. The elongated warning lamp claim 1, wherein the main light module comprises a connecting holder, a main light set and two side light sets; one end of the connecting holder is opened a connecting ring groove connected the main light set and the two side light sets, the two side light sets plug into two sides of the main light set respectively with a socket pin of the two side light sets; other end of the connecting holder is provided with the upper position block and the lower position block.

4. An elongated warning lamp, wherein the elongated warning lamp comprising:
a body,
two main light modules connected to two sides of the body,
and a plurality of side light modules connected to the two sides of the body;

wherein the two ends of the body are provided with an upper position cavity and a lower position cavity which play a reinforcement role, each connecting end of the main light modules is provided with an upper position block and a lower position block; the upper position block matches and connects with the upper position cavity; the upper position block is formed in a flat shape, both upper surface and lower surface of the upper position block are provided with connection projections for enhancing connecting uniformity; the lower position block matches and connects with the lower position cavity; the lower position block is formed in an isosceles trapezoid shape, two inclined side surfaces of the lower position block are provided with the connection projections for enhancing connecting uniformity; two guide block are provided between the upper position block and the lower position block; the two guide block match two guide grooves formed between the upper position cavity and the lower position cavity;

wherein two sides of the body are provided with a slot, a connecting end of the side light module is provided with at least one snap, the snap matches and connects with the slot, and can slide along the slot; two sides of the body and connecting ends of the side light module are formed as ramps, the two ramps bond with each other, when the snap plugs into the slot;

wherein the side light module comprises a light cover with an opening, a reflective cup and a light plate provided in the light cover, two ends of the side part of the light cover are provided with the snap, the opening is provided with a heat-radiating plate; and wherein the opening is provided with a plurality of bumps, the heat-radiating plate contacts with a plurality of the bumps and pastes into the opening with glue.

5. The elongated warning lamp according to claim 4, wherein the reflective cup is provided with a first reflective layer and a second reflective layer for transition connection, both the first reflective layer and the second reflective layer are formed as an arc.

6. An elongated warning lamp, wherein the elongated warning lamp comprising:
a body,
two main light modules connected to two sides of the body,
and a plurality of side light modules connected to the two sides of the body;

wherein the two ends of the body are provided with an upper position cavity and a lower position cavity which play a reinforcement role, each connecting end of the main light modules is provided with an upper position block and a lower position block; the upper position block matches and connects with the upper position cavity; the upper position block is formed in a flat shape, both upper surface and lower surface of the upper position block are provided with connection projections for enhancing connecting uniformity; the lower position block matches and connects with the lower position cavity; the lower position block is formed in an isosceles trapezoid shape, two inclined side surfaces of the lower position block are provided with the connection projections for enhancing connecting uniformity; two guide block are provided between the upper position block and the lower position block;

the two guide block match two guide grooves formed between the upper position cavity and the lower position cavity; and wherein two sides of the body are provided with a slot, a connecting end of the side light module is provided with at least one snap, the snap matches and connects with the slot, and can slide along the slot; two sides of the body and connecting ends of the side light module are formed as ramps, the two ramps bond with each other, when the snap plugs into the slot.

7. The elongated warning lamp according to claim 6, wherein the upper position cavity comprises a first upper position cavity, a second upper position cavity located on the two sides of end parts of the body and a third upper position cavity located between the first upper position cavity and the second upper position cavity; the upper position block comprises a first upper position block, a second upper position block located two sides of connecting ends of the main light modules and a third upper position block located between the first upper position block and the second upper position block, the first upper position block, the second upper position block and the third upper position block match and connect with the first upper position cavity, the second upper position cavity and the third upper position cavity respectively.

8. The elongated warning lamp according to claim 7, wherein both upper surface and lower surface of the first upper position block, the second upper position block and the third upper position block are provided with the connection projections.

9. The elongated warning lamp according to claim 8, wherein the connection projections located on lower surfaces and the connection projections located on the upper surfaces staggered with each other.

10. The elongated warning lamp according to claim 6, wherein the body comprises an upper body and a lower body, lower part of the upper body is provided with a trapezoidal groove, upper part of the lower body is provided with a trapezoidal projection which matches the trapezoidal groove; the upper position cavity and the lower position cavity is located on the upper body and the lower body respectively.

11. The elongated warning lamp according to claim 6, wherein the main light module comprises a connecting holder, a main light set and two side light sets; one end of the connecting holder is opened a connecting ring groove connected the main light set and the two side light sets, the two side light sets plug into two sides of the main light set respectively with a socket pin of the two side light sets; other end of the connecting holder is provided with the upper position block and the lower position block.

12. The elongated warning lamp according to claim 11, wherein the main light module further comprises a mask, the mask covers the main light set and the two side light sets and then plugs into the connecting ring groove.

13. The elongated warning lamp according to claim 12, wherein the connecting ring groove is provided with an annular sealed ring.

14. The elongated warning lamp according to claim 13, wherein the main light set comprises a main light holder, a main light cover, and a main light plate located in the main light holder, two sides of the main light holder are provided with a connecting buckle, two sides of the main light cover are provided with a connecting buckle groove, the connecting buckle fastens the connecting buckle groove; the socket pin plugs into the connecting buckle groove, two side light sets plug into two sides of the main light set.

15. The elongated warning lamp according to claim 14, wherein one end of the main light holder toward the connecting holder is provided with an outgoing coil for fixing a power cord, the outgoing coil is provided with a plurality of outlet holes, the outlet holes are formed as a shape being big at both ends and small in the middle.

16. The elongated warning lamp according to claim 15, wherein two ends of the outlet holes are extended outward, and are formed as a taper.

17. The elongated warning lamp according to claim 11, wherein the side lights sets are provided with a light guide strip.

18. The elongated warning lamp according to claim 6, wherein the side light module comprises a light cover with an opening, a reflective cup and a light plate provided in the light cover, two ends of the side part of the light cover are provided with the snap, the opening is provided with a heat-radiating plate.

19. The elongated warning lamp according to claim 18, wherein the opening is provided with a plurality of bumps, the heat-radiating plate contacts with a plurality of the bumps and pastes into the opening with glue.

20. The elongated warning lamp according to claim 18, wherein the reflective cup is provided with a first reflective layer and a second reflective layer for transition connection, both the first reflective layer and the second reflective layer are formed as an arc.

* * * * *